United States Patent
Christensen

(10) Patent No.: US 8,181,748 B2
(45) Date of Patent: May 22, 2012

(54) LIFTING DEVICE FOR THE ASSEMBLY OF A WIND TURBINE

(75) Inventor: Mogens Christensen, Silkeborg (DK)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 314 days.

(21) Appl. No.: 12/293,651

(22) PCT Filed: Mar. 28, 2007

(86) PCT No.: PCT/ES2007/000167
§ 371 (c)(1),
(2), (4) Date: Mar. 23, 2010

(87) PCT Pub. No.: WO2007/125138
PCT Pub. Date: Nov. 8, 2007

(65) Prior Publication Data
US 2010/0189531 A1    Jul. 29, 2010

(30) Foreign Application Priority Data
Mar. 28, 2006  (ES) .................................. 200600801

(51) Int. Cl.
*B66B 9/06*  (2006.01)
(52) U.S. Cl. ......... 187/245; 187/274; 187/359; 187/900
(58) Field of Classification Search .............. 52/29, 111, 52/115, 632, 123.1; 248/161, 414, 157, 354.1; 187/245, 900; 254/106, 90, 931, 124; 416/DIG. 6
See application file for complete search history.

(56) References Cited

U.S. PATENT DOCUMENTS

| 5,553,686 A * | 9/1996 | Jensen ........................... 187/408 |
| 2002/0084142 A1* | 7/2002 | Brennan et al. ................ 182/133 |
| 2002/0095878 A1* | 7/2002 | Henderson ....................... 52/116 |
| 2005/0005562 A1* | 1/2005 | Henderson et al. ............. 52/633 |

FOREIGN PATENT DOCUMENTS

| DE | 1112272 | * | 8/1961 |
| DE | 37 18436 | | 12/1988 |
| DE | 10215915 A1 | * | 10/2003 |
| ES | 2 246 734 | | 2/2006 |
| FR | 1 344 281 | | 11/1963 |
| FR | 1344281 | * | 11/1963 |
| WO | WO 2005084185 A2 | * | 9/2005 |

* cited by examiner

*Primary Examiner* — Robert Canfield
*Assistant Examiner* — Jody Giacoman
(74) *Attorney, Agent, or Firm* — Ladas & Parry LLP

(57) ABSTRACT

Lifting device for the assembly of a wind turbine of which the top part of the tower (21) is fixed to the supporting structure (32) located above the upper platform (31) of the lifting device (3). The sections (221) of the lower part (22) of the tower are then installed, in such a way that the lifting device (3) is embedded in the anchoring beams (225) of the lower part (22). 10.In order to lift the upper part (21) of the tower, the upper platform (31) is separated from the lower platform (33) using cylinders (34) between said platforms, the upper platform (31) is fixed to the anchoring beams (225), the lower platform (33) is freed from the anchoring beams (225), the platforms (31, 33) are brought closer together and the lower platform (33) is anchored to said beams (225). Continuing successively until the flanges (211, 222) of the parts (21, 22) of the tower make contact.

10 Claims, 5 Drawing Sheets

LIFTING DEVICE FOR THE ASSEMBLY OF A WIND TURBINE

FIELD OF THE INVENTION

The invention relates to a lifting method and lifting device for the erection of hollow towers comprised of more than one part, and in particular, to a lifting method and lifting device for carrying out the assembly of a wind turbine.

BACKGROUND OF THE INVENTION

As wind turbines tend to provide more power, the weight and dimensions of their components increase considerably and, consequently, the towers become taller and more robust. As a result, the transport of the towers must be divided into parts, and some parts even into sections, making the assembly of a wind turbine ever more complicated and costly. One way of reducing the high costs of the wind turbine assembly process consists in the substitution of large sized cranes for conventional cranes and for assembly devices. Below is a state of the art summary relating to the inventions used for the assembly of towers and wind turbines.

Patent application U.S. Pat. No. 6,782,667 proposes a wind turbine assembly system based on a telescopic tower which is erected using a pivoting structure. Once the tower is placed in a vertical position, its parts are deployed using a series of cables and pulleys located inside the tower.

Patent application U.S. 20050005562 also describes a telescopic tower with pulleys which elevate or collect the different parts of the wind turbine tower. In this sense, there are a large number of patents related to telescopic towers which are erected via the use of pulleys and cables located within the structure, such as patent applications U.S. Pat. Nos. 3,248,831, 4,785,309, CH677516, EP0942119, etc.

Patent application DE19647515 avoids the use of large infrastructures for the installation of towers, using a mechanism to elevate and assemble the parts of the tower which is fixed to and advances along the exterior of the parts of the tower already installed.

Patent application U.S. Pat. No. 6,955,025 describes an assembly method based on the use of telescopic cranes of large dimensions sufficient for lifting a wind turbine that has articulated tower parts.

Patent application U.S. Pat. No. 4,590,718 describes a removable and portable structure for the assembly of the parts of a wind turbine tower and for later rotation of the wind turbine once assembled.

Patent application WO2004101990 contemplates a mechanism with which to carry out the vertical manufacturing of the tower in the very place where the wind turbine is to be installed.

However, none of these inventions are similar to nor do they provide the advantages of the lifting device for the assembly of a wind turbine which is described below.

DESCRIPTION OF THE INVENTION

The invention describes a lifting device and an assembly method for the erection of a tower divided into at least one upper part and another lower part substituting large assembly cranes for a conventional crane. Said crane places the upper part of the tower vertically on the lifting device and then places the sections of the lower part of the tower around said upper part, in such a way that the fixtures to the anchoring beams of the lifting device are embedded into the anchoring beams which are arranged in the inside area of the lower part of the tower and serve to guide and fix the lifting device along its route. Then, the lifting device fixes its lower platform to the anchoring beams and separates the upper platform using cylinders located between both platforms, it then fixes the upper platform to the anchoring beams and releases the lower platform in order to move it closer to the upper platform using said cylinders, and it continues successively until the lower flange of the upper part of the tower makes contact with the upper flange of the lower part of the tower and both parts are assembled. From this point on, the upper part of the tower is uncoupled from the lifting device and the descent of the lifting device is carried out using the previous steps in inverse order. Finally, when the lifting device arrives at the base of the tower it is dismantled and removed from the tower.

Firstly, this invention proposes a lifting device for the erection of towers, and secondly, an assembly procedure for wind turbines by using said lifting device.

The lifting device is formed by a series of cylinders which move an upper platform with respect to another lower platform, a portable structure and a series of guide rollers which direct the advancing movement of the lifting device along the lower part of the tower.

The use of a unit of at least 3 dual effect cylinders is proposed, which will be fixed to the lower platform and to the upper platform, in such as way that it allows the platforms to be separated or brought closer together by a particular distance.

The upper platform consists of a ring-shaped support where the supporting structure and the lifting device cylinders are secured. It also provides fixtures to the anchoring beams on the outer perimeter of the ring. The connection to the supporting structure is carried out by screwing the supporting structure to the upper side of the platform, and the cylinders are fixed to the lower side of the platform using pivoting fixtures. The connection methods for the upper platform are adapted to the shape of the anchoring beams of the lower part of the tower, in such a way that they allow the movement of said fixtures along the anchoring beams and therefore the movement of the upper platform along the lower part of the tower, while allowing for the platform to be fixed at certain points of said anchoring beams. Finally, the platform may be comprised of various independent parts, which enable it to be transported, installed and uninstalled in a simple way.

In addition, the lower platform has the same design as the upper platform with the difference being that the fixtures for the cylinder are rigid and are located on the upper side, and it does not have fixtures for a supporting structure.

The supporting structure consists of a lattice screwed to the lower flange of the upper part of the tower on one end, and to the upper platform of the lifting device on the other, which uniformly distributes the loads that affect the upper part of the tower during the elevation process to the upper platform or the anchoring beams. For this purpose, the support structure has as many guide rollers as the lower part of the tower has anchoring beams, therefore the horizontal reactions created by the wind load upon the nacelles and the upper part of the tower and the momentum of the centre of gravity of the nacelle are transmitted to the lower part of the tower through said guide rollers or through the joints of the lifting device and the anchoring beams.

Another practical realisation of the lifting device is that which substitutes the lower platform for a latticed structure with the same method for connection to the anchoring beams and fixtures for the cylinders, or that which substitutes the support structure and the upper platform for one sole lattice structure which includes the guide rollers, the methods for connection to the anchoring beams, the fixtures for the cylinders and the fixtures for the upper part of the tower. The invention also contemplates any combination of the previously mentioned options.

The lower part of the tower is formed by at least two removable sections and houses within its interior a minimum of three anchoring beams where the upper and lower platforms of the lifting device are fixed throughout its route. All of the anchoring beams have a series of orifices at the same height and equidistant to the tower shaft into which the connection fixtures for the upper and lower platforms of the lifting device fit. The distance between three contiguous orifices of the anchoring beams must be less than or equal to the maximum length of the cylinder shafts and, on the contrary, the distance between two adjacent orifices of the anchoring beam must be more than or equal to the size of the cylinders when the shaft is retracted. In addition, the lower part of the tower has a series of upper guides located on the upper flange which direct the advance of the upper part of the tower and transmit part of the loads produced in it to the lower part of the tower.

DESCRIPTION OF THE PREFERRED REALISATION

Figure 1:
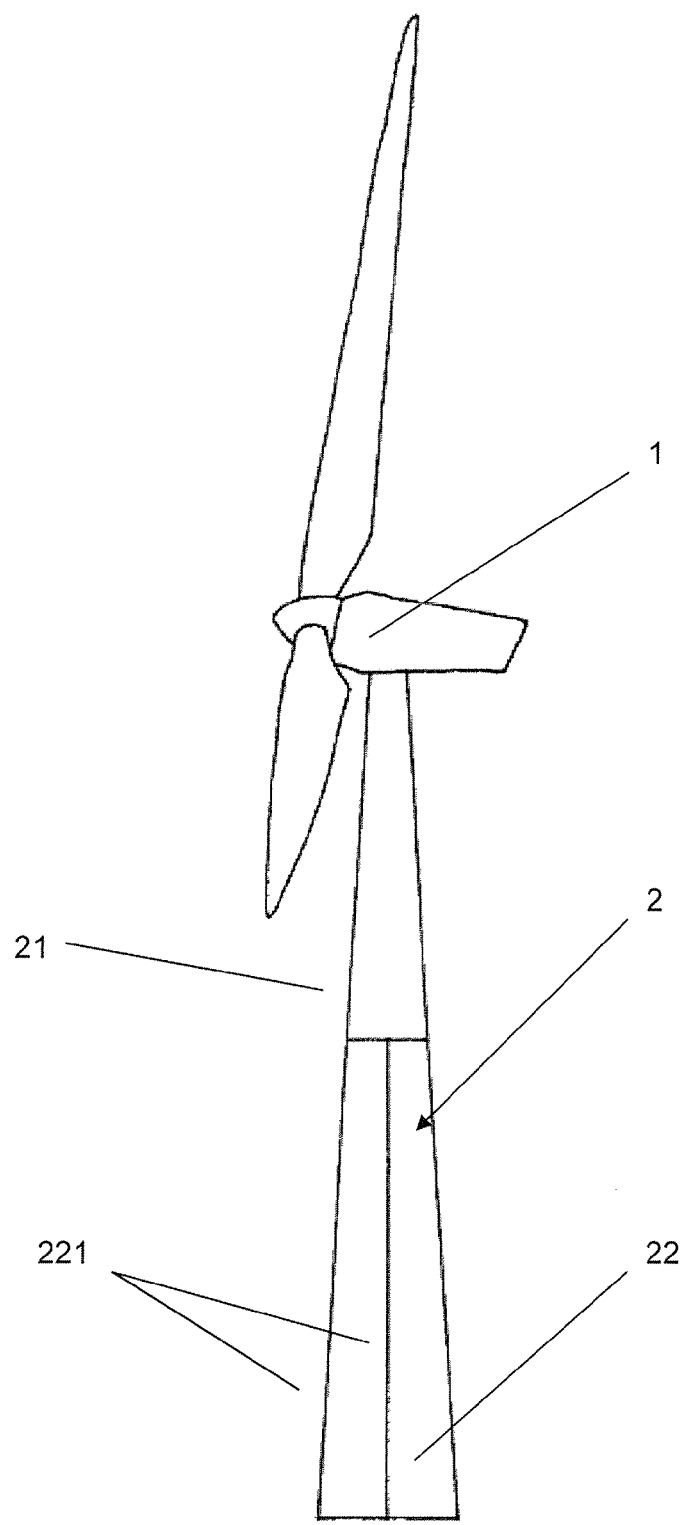
FIG. 1 shows a sketch of the different parts which comprise a wind turbine
Figure 2:
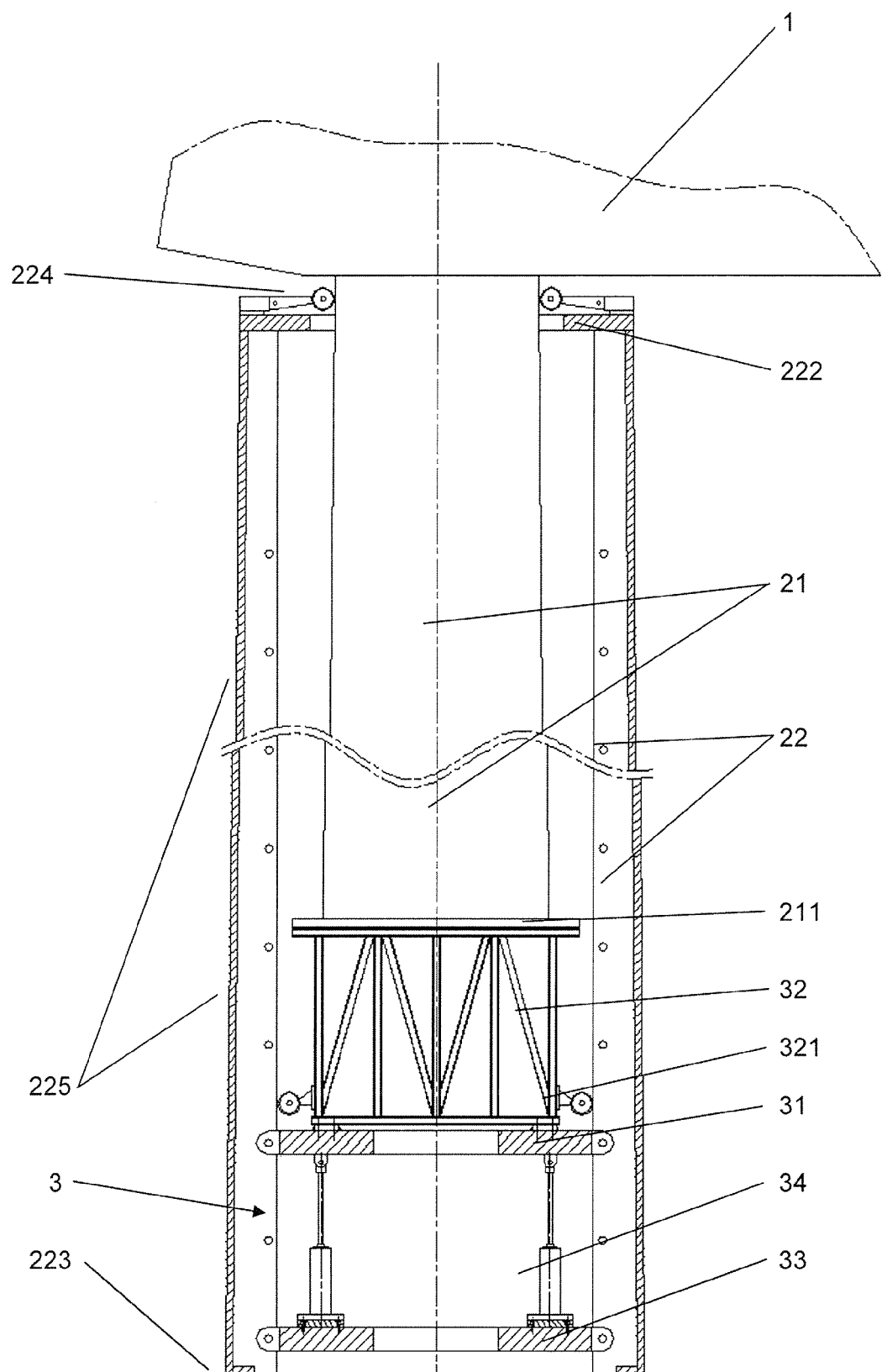
FIG. 2 represents a sketch of a 120° cut in the length section of the lower part of the tower where the arrangement of the lifting device and the other elements described in the invention are shown.
Figure 3:
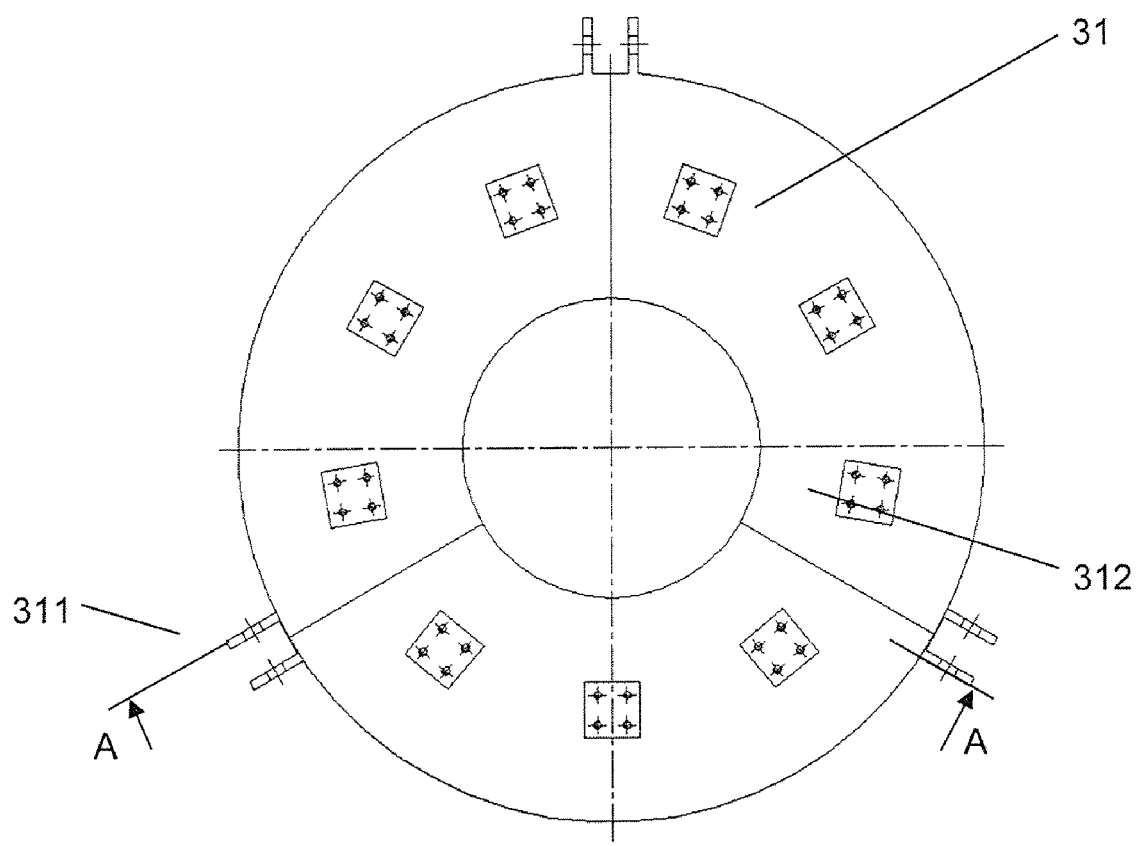
FIG. 3 shows a view from above of the upper lifting device platform as contemplated in the preferred realisation.
Figure 4:
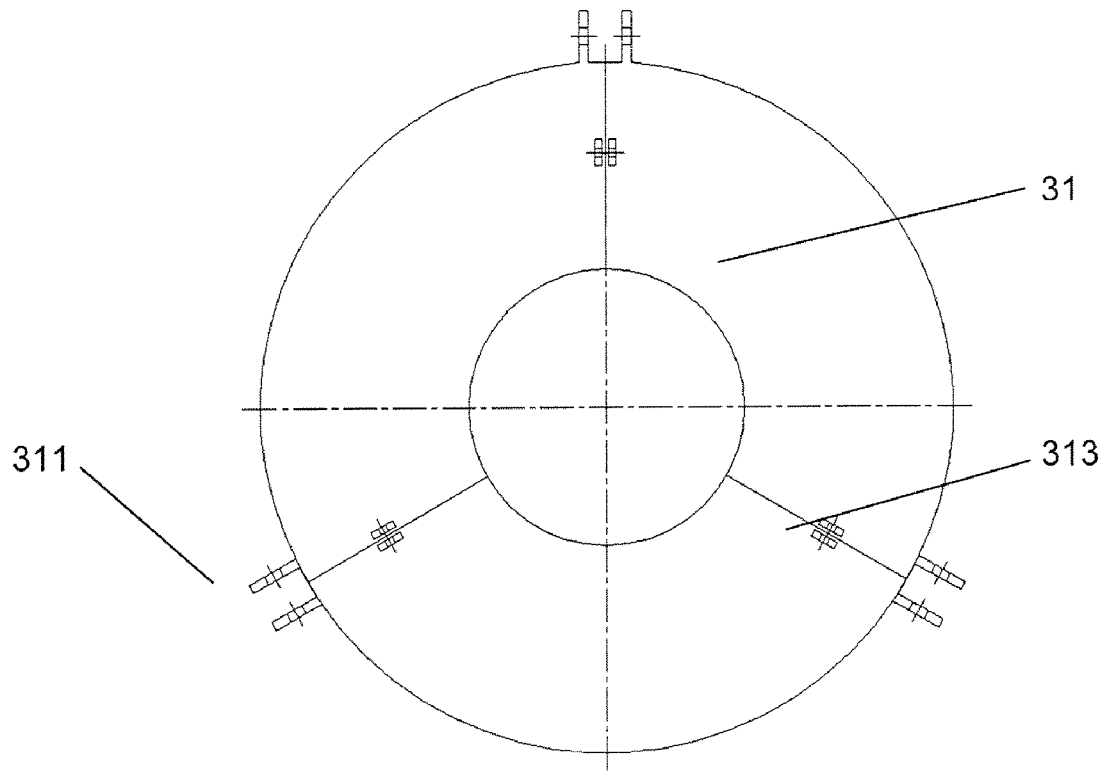
FIG. 4 shows the lower part of the upper lifting device platform.
Figure 5:
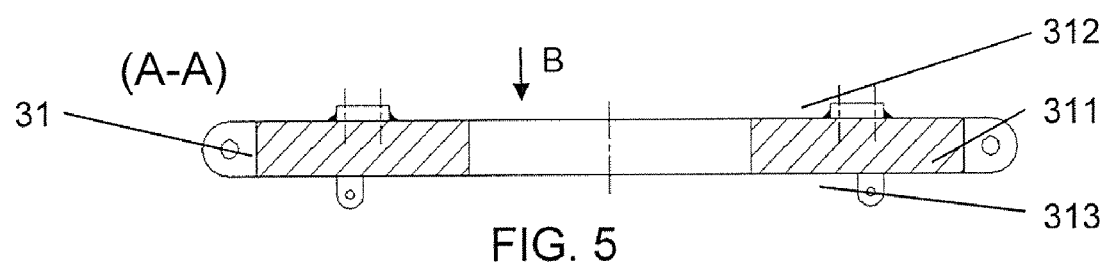
FIG. 5 shows a partial view of one of the three parts which preferably comprise the upper platform of the lifting device where the connection methods can be seen.
Figure 6:
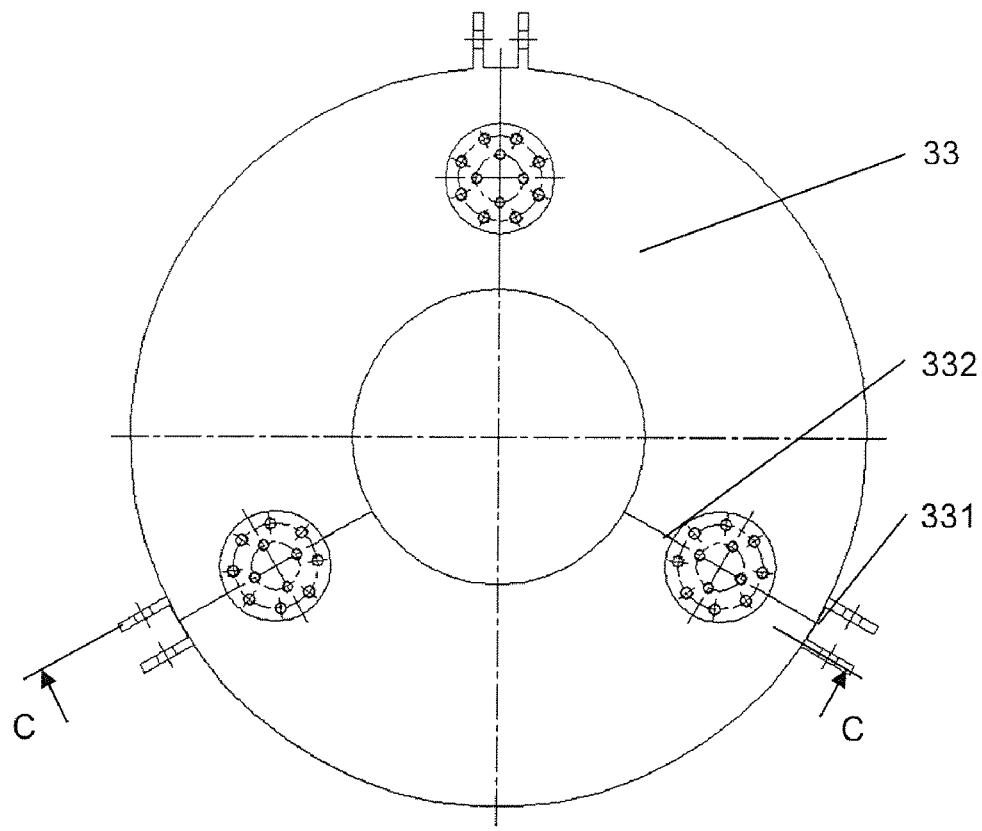
FIG. 6 shows a view from above of the lower lifting device platform as contemplated in the preferred realisation.
Figure 7:
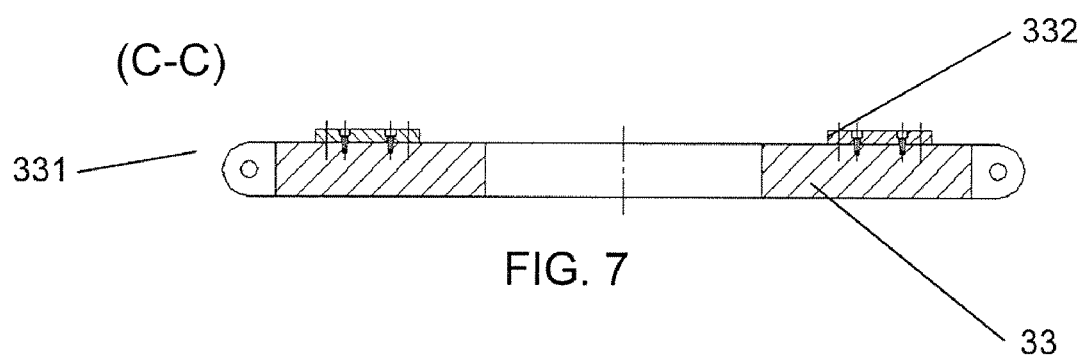
FIG. 7 shows a partial view of one of the three parts which preferably comprise the lower platform of the lifting device where the connection methods can be seen.

Description of the Notes:
1: Wind turbine nacelle
2: Wind turbine tower
21: Top part of tower
211: Lower flange on top part of tower
22: Bottom part of tower
221: Sections on bottom part of tower
222: Upper flange on bottom part of tower
223: Lower flange on bottom part of tower
224: Top guide rollers
225: Anchoring beams
3: Lifting device
31: Top platform
311: Fixtures to the anchoring beams
312: Fixtures to the supporting structure
313: Fixtures for the cylinders
32: Supporting structure
321: Guide rollers
33: Bottom platform
331: Fixtures to the anchoring beams
332: Fixtures for the cylinders
34: Cylinders As shown in FIG. 1, the wind turbine is comprised of a nacelle (1) and a tower (2). Preferably the tower (2) of the wind turbine is comprised of two parts (21, 22) joined together by the flanges which they have at the ends. The shape of the tower (2) is preferably conical, although the invention is applicable to any hollow tower independently of the number of tower parts (2) and of its cylindrical, hexagonal, octagonal design etc.

The lower part (22) of the tower (2), is comprised of at least two sections (221) preferably prefabricated in reinforced concrete, which are joined together by any of the existing state of the art techniques. The height of the upper part (22) of the tower (2) is preferably less than 60 meters, whilst the interior diameter of the base of the tower (2) is 7 meters, and the interior diameter of the upper vertex of said part (22), is 5.5 meters. Both ends of the lower part (22) of the tower have an internal flange (222, 223) one which connects one end to the foundations and one which connects the other to the lower flange (211) of the upper part (21) of the tower (2).

In addition, the upper part (21) of the tower is preferably manufactured in one piece of steel and is approximately 58 meters in height. Its base has an external diameter of preferably 4.2 meters and has an external flange (211) welded to join the upper part (21) to the internal flange (222) of the lower part (22) of the tower (2). The external diameter at the upper end, where it is coupled to the nacelle, is approximately 3.5 meters.

These heights for the parts (21, 22) of the tower allow the use of conventional cranes, in such a way that just one Liebherr LTM 1500 model crane with a telescopic arm of 84 meters is able to place the upper part (21) of the tower (2) upon the lifting device (3), install the nacelle (1) of approximately 60 tonnes in weight on its upper part, and place the lower part (22) of the tower around the lifting device (3) and the upper part (21) of the tower (2). Therefore, by the use of the assembly method of this invention the assembly costs of the wind turbine are considerably reduced compared with the techniques used in the state of the art until now.

The lifting device (5) is comprised of at least three dual effect cylinders (34) which are fixed to the lower platform (36) and to the upper platform (31), so that together they can lift a load heavier than that resulting from the sum of the upper part (21) of the tower and the nacelle (1), in excess of 200 tonnes. Furthermore, as they are dual effect cylinders, this allows controlled shaft movement in both directions, making it possible for the two platforms (31, 33) to be separated or brought together a determined distance, preferably 1 meter away from each other. The cylinder unit (34) can be remote-controlled electrically or hydraulically, avoiding the presence of operators in the interior of the tower (2) during the assembly process.

Preferably, the upper platform (31) of the lifting device (3), consists of three symmetrical parts joined together, resulting in a removable support in the form of a ring. On the external perimeter of the upper platform (31) there are preferably three lug-shaped fixtures to the anchoring beams (311), where pins are inserted to fix the upper platform (31) of the lifting device (3) to the anchoring beams (225) located lengthwise on the lower part of the tower (22). On the lower side of the upper platform (31) there are preferably three pivoting fixtures for the cylinders (34) of the lifting device (3) which are radially aligned with the fixtures to the anchoring beams (311) and therefore with the anchoring beams (225) of the lower part (22) of the tower. The upper side of the upper platform (31) has fixtures (312) for screwing to the support structure (32).

The base of the lifting device (3) is formed by a lower platform (33), which, as is the case of the upper platform (31), preferably consists of three symmetrical parts joined together, resulting in a removable support in the shape of a ring. On the external perimeter of the lower platform (33) there are also preferably three lug-shaped fixtures for the anchoring beams (311) where pins are inserted to fix the lower platform (33) of the lifting device (3) to the anchoring beams (225) located lengthwise on the lower part of the tower (22). On the other hand, contrary to the upper platform (31), the fixture methods for the cylinders (332) are rigid and are located on the upper side. These fixtures for the cylinders (332) are also radially aligned with the fixtures for the anchoring beams and therefore with the anchoring beams (225). Therefore, once both platforms (31, 33) are connected by the cylinders (34) and the system is assembled, the anchoring beams (225) of the lower part (22) of the tower are inserted into the lugs of both platforms (31, 33), allowing for the movement and fixture of the lifting device (3) on them.

The support structure (32) consists of a lattice, the ends of which are adapted for fixing to the lower flange (211) of the upper part (21) of the tower, and to the upper platform (31) of the lifting device (3) by means of screwed joints. The support structure (32) preferably has a height in excess of 5 meters, in order to reduce the route of the lifting device (3) along the lower part (22) of the tower and to decrease the horizontal reactions caused by the momentum of the nacelle (1) of the wind turbine and the wind loads on the nacelle unit (1) and the upper part (21) of the tower. The support structure (32), therefore, must be able to support a weight of in excess of 200 tonnes and horizontal forces of around 80-100 tonnes at the end of the lifting route. For this purpose, the support structure (32) has three cone-shaped guide rollers (321) that bear on the anchoring beams (225) of the lower part (22) of the tower to direct the lifting of the upper part (21), while they distribute part of the horizontal loads to the lower part (22) of the tower.

The lower part (22) of the tower preferably consists of three removable sections (221) and houses in its interior three anchoring beams (225) to which the upper (31) and lower (33) platforms of the lifting device (3) are fixed during its advancing movement. It is important to note that the orifices of all of the anchoring beams (225) must be horizontally aligned and must be at the same distance from the tower (2) shaft. Therefore, in the preferred realisation, when a conical tower is used, the anchoring beams have a variable section along the lower part (22) of the tower to adapt to the previous considerations. The separation between two adjacent orifices of the anchoring beams (225) is preferably 1 meter in distance, and the diameter of the orifices must be equivalent to the pins of the fixtures for the upper (31) and lower (33) platform of the lifting device (3). The lower part (22) of the tower also has three upper guides (224) located in its upper flange (222) to direct the advancing movement of the upper part (21) of the tower and to transmit the horizontal forces produced by the nacelle mass (1) and by the wind forces on the upper part (21) of the tower and the nacelle (1) to the lower part (22) of the tower. These upper guides (224) are cone-shaped wheels designed to support horizontal forces in excess of 80-100 tonnes which could occur at the final lifting stage of the upper part (21) of the tower.

The main stages which comprise the method, as per a realisation of this invention, for the assembly of a wind turbine are described below.

1. The lifting device (3) is assembled in the centre of the foundations of the tower (2) of the wind turbine.
2. The upper part (21) of the tower is mounted and secured onto the lifting device (3).
3. If the upper part (21) of the tower is comprised of more that one part, the rest of the parts are mounted onto the part which is already secured to the lifting device (3) and the nacelle (1) is placed upon the last of the upper parts.
4. The sections (221) of the lower part (22) of the tower are placed and assembled around the lifting device (3) and the upper part (21).
5. Before beginning the task of lifting the tower, the correct centering of the unit of structures (3, 21, 22) is ensured and the upper guides (224) are mounted on the upper flange (222) of the lower part (22) of the tower.
6. The cylinders (34) are activated until the upper platform (31) separates from the lower platform (33) of the lifting device (3), by at least two orifices of the anchoring beams (225).
7. The upper platform (31) of the lifting device (3) is fixed to the anchoring beams (225).
8. The lower platform (33) is released from the lifting device (3).
9. The cylinders (34) are activated in order to bring the lower platform (33) closer to the upper platform (31) of the tool by at least the distance equivalent to one orifice of the anchoring beams (225).
10. The lower platform (33) of the lifting device (3) is secured to the anchoring beams (225).
11. The upper platform (31) of the lifting device (3) is released.
12. Steps 6-11 are repeated as many times as necessary until the lower flange (211) of the upper part (21) of the tower reaches the upper flange (222) of the lower part (22) of the tower.
13. The upper platform (31) of the lifting device (3) is fixed to the anchoring beams (225).
14. The lower flange (211) of the upper part (21) of the tower is screwed to the upper flange (222) of the lower part (22) of the tower.
15. The upper part (21) of the tower is released from the lifting device (3), in order to proceed with the descent of the lifting device (3).
16. The upper platform (31) of the lifting device (3) is released from the anchoring beams (225).
17. The cylinders (34) are activated until the upper platform (31) moves closer to the lower platform (33) of the lifting device (3), by at least the distance equivalent to one orifice of the anchoring beams (225).
18. The upper platform (31) of the lifting device (3) is fixed to the anchoring beams (225).
19. The lower platform (33) of the lifting device (3) is released from the anchoring beams (225).
20. The cylinders (34) are activated in order to separate the lower platform (33) from the upper platform (31) of the lifting device by at least one orifice of the anchoring beams (225).
21. The lower platform (33) of the lifting device (3) is secured to the anchoring beams (225).
22. Steps 16-21 are repeated as many times as necessary until the lower platform (33) of the lifting device (3) arrives at the base of the tower (2).
23. All parts of the lifting device (3) are dismantled and removed for the wind turbine tower.

The invention claimed is:

1. Lifting device for the assembly of a wind turbine formed by a nacelle (1) and a tower (2) comprised of at least a lower part (22) and an upper part (21), where the lower part (22) is divided into at least two sections (221) and is assembled with the upper part (21) by means of an upper flange (222) which is screwed to a lower flange (211) of the upper part (21) of the tower (2), comprises: a lower platform (33) connected to an upper platform (31) by cylinders (34) situated between the platforms (31, 33) which move said platforms (31, 33) apart or closer together; including a support structure (32) upon the upper platform (31) to which the upper part (21) of the tower (2) is fixed, said support structure being equipped with guide rollers (321) to direct the advancing movement of the support structure; anchoring beams (225) located lengthwise along internal contours of the lower part (22) of the tower (2) along which the platforms (31, 33) of the lifting device (3) move and are fixed and upon which the guide rollers (321) of the support structure (32) run; and upper guide rollers (224) located on the upper flange (222) of the lower part (22) to direct the lifting of the upper part (21) of the tower (2).

2. Lifting device for the assembly of a wind turbine in accordance with claim 1 where in the upper platform (31) is comprised of three removable sections, has fixtures which protrude radially and are distributed symmetrically along its contours, includes pivoting fixtures (313) for the cylinders (34) on the lower side radially aligned with the fixtures, and has fixtures (312) for screwing to the support structure (32) distributed uniformly along the upper side.

3. Lifting device for the assembly of a wind turbine in accordance with claim 1 where in the lower platform (33) is comprised of three removable sections, has fixtures which protrude radially and are distributed symmetrically along its contours and having fixtures (332) for screwing the cylinders (34) located on the upper side radially aligned with the fixtures to the anchoring beams (331).

4. Lifting device for the assembly of a wind turbine in accordance with claim 1 where in the upper platform (31) and the lower platform (33) are embedded into the lower part (22) of the tower (2) by means of fixtures of a lug-shaped design adapted for movement along the anchoring beams (225) and fixture to orifices of said anchoring beams (225).

5. Lifting device for the assembly of a wind turbine in accordance with claim 1 where in dual effect cylinders (34) are activated remotely to separate and bring closer to each other the upper and lower platforms (31, 33).

6. Lifting device for the assembly of a wind turbine in accordance with claim 1 where in the support structure (32) consists of a partially or totally removable lattice which has fixtures for connection to the lower flange (211) of the upper part (21) of the tower, fixtures for connection to the upper platform (31), and guide rollers (321) which rest upon the anchoring beams (225) of the lower part (22) of the tower.

7. Lifting device for the assembly of a wind turbine generator in accordance with claim 1 where in orifices of the anchoring beams (225) are horizontally aligned.

8. Lifting device for the assembly of a wind turbine in accordance with claim 1 where in the number of anchoring beams (225) is the same as the number of sections (221) into which the lower part (22) of the tower (2) is divided, and the same as the number of parts into which the platforms (31, 33) are divided, the number of cylinders (34), the number of fixtures of the upper and lower platforms (31, 33), and the number of guide rollers (321) of the support structure (32) of the lifting device (3).

9. Lifting device for the assembly of a wind turbine as per claim 1 where in the number of anchoring beams (225) is three.

10. Lifting device for the assembly of a wind turbine as per claim 1 where in the upper guides (224) consists of at least three cylindrical wheels.

* * * * *